Dec. 9, 1924.
C. S. TURNER
1,518,420
SPEEDOMETER ADAPTER FOR INSTRUMENT BOARDS
Filed Sept. 11, 1922
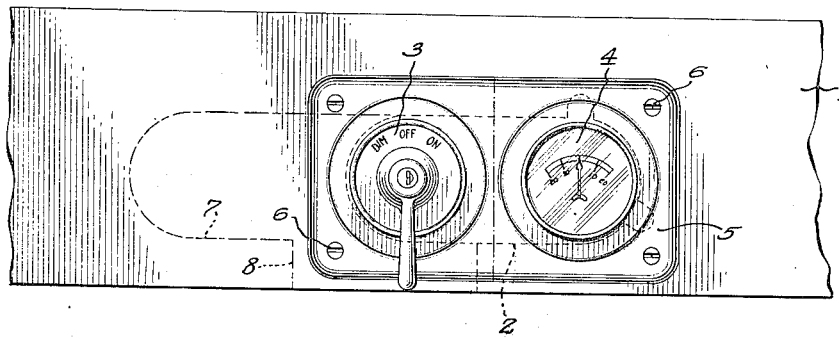
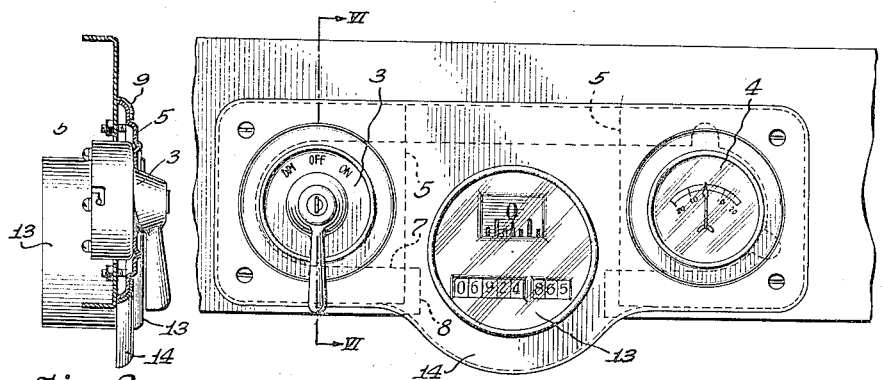
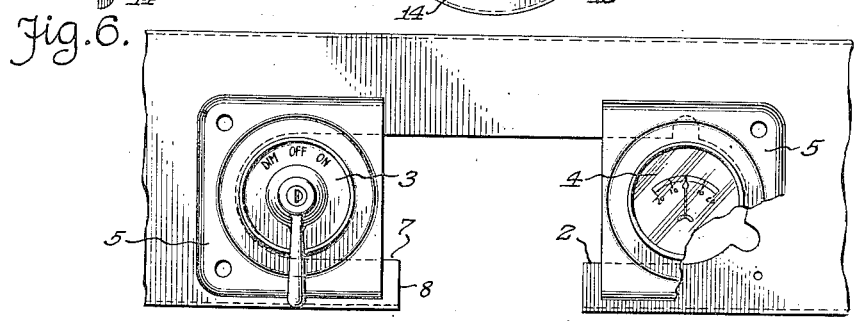
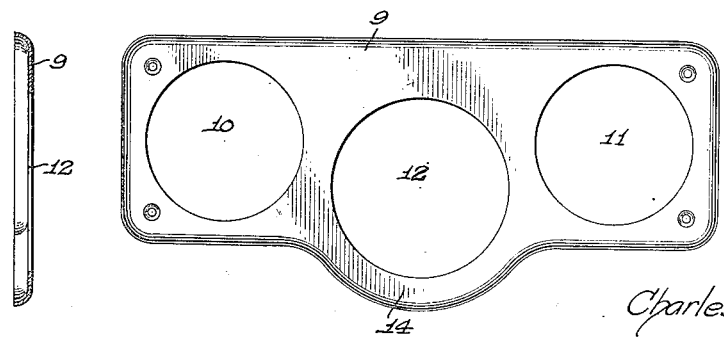
Inventor
Charles S. Turner,
By
Attorneys Patented Dec. 9, 1924.

1,518,420

UNITED STATES PATENT OFFICE.

CHARLES S. TURNER, OF DETROIT, MICHIGAN.

SPEEDOMETER ADAPTER FOR INSTRUMENT BOARDS.

Application filed September 11, 1922. Serial No. 587,398.

*To all whom it may concern:*

Be it known that I, CHARLES S. TURNER, a citizen of the United States of America, residing at Detroit, in the county of Wayne and State of Michigan, have invented certain new and useful Improvements in Speedometer Adapters for Instrument Boards, of which the following is a specification, reference being had therein to the accompanying drawings.

This invention relates to a speedometer adapter for the instrument board of a well known automobile which is placed on the market without a speedometer.

One of the objects of my invention is to provide a speedometer adapter that may be expeditiously associated with a switch and gauge, forming part of the instrument board, for supporting a speedometer in proximity to the switch and gauge, so that observations may be readily made at one location on the instrument board. The speedometer adapter permits of a symmetrical and neat appearing mounting being made for such instruments as a switch, gauge, and speedometer, and the adapter obviates the necessity of discarding the usual instruments of the instrument board.

My invention involves a method of mounting the speedometer on an instrument board provided with an opening over which the support is placed for holding a switch and gauge, which method involves enlarging the instrument board opening; dividing the support of the instruments; mounting the divided support parts in the ends of the enlarged opening; placing a speedometer plate or support over the instrument supports, and then securing the speedometer support to the instrument board. The speedometer support places the instrument between the separated instruments and as a whole affords a neat and attractive instrument mounting.

The construction of the speedometer adapter and the method of mounting the same will be hereinafter described and then claimed.

Figure 1 of the drawing is a front elevation of a portion of an instrument board of a well known make of automobile which instrument board has a switch and gauge contiguous to each other;

Fig. 2 is a similar view illustrating how the instrument board opening is enlarged and the switch and gauge separated to provide clearance for a speedometer;

Fig. 3 is a front elevation of a speedometer adapter or plate devoid of a speedometer;

Fig. 4 is a cross sectional view of the same;

Fig. 5 is a front elevation of the speedometer adapter supporting a speedometer relative to the other instruments of the instrument board, and Fig. 6 is a cross sectional view taken on the line VI—VI of Fig. 5.

In the drawing, the reference numeral 1 denotes an instrument board or support which for a well known make of car has a small oblong opening 2 providing clearance for a switch 3 and a gauge 4, these two instrumets being supported in the opening 2 by a support or escutcheon plate 5 connected to the instrument board 1 by screws 6 or other fastening means, the support or plate 5 being in one piece forming a frame about the two instruments.

In order that a speedometer may be associated with the switch 3 and the gauge 4. I remove the support 5 and its instruments and enlarge or elongate the opening 2, as at 7 so as to form an opening of greater length than the opening 2, and I also cut away or slot the lower edge of the instrument board, as at 8.

Next, I cut or otherwise divide the support or escutcheon plate 5 into two parts, as best shown in Fig. 2 and place a part in one end of the opening 2 and a part in one end of the opening 7. This leaves a gap between the divided parts of the support 5.

Then, I provide an adapter 9 which is in the form of an oblong speedometer support or escutcheon plate having end openings 10 and 11 and an intermediate opening 12, said intermediate opening accommodating a conventional form of speedometer 13.

The speedometer adapter is now mounted over the separated end parts of the instrument support 5 with the openings 10 and 11 providing clearance for the instruments 3 and 4 respectively, and the support 9 and the instrument board 1 can be provided with openings so that the same screw 6 may be employed for securing the plate 9 and the independent instrument supports to the instrument board 1. The speedometer 13 is thus mounted between the switch 3 and the gauge 4 and I prefer to have the speedometer opening 12 slightly in a plane below the instrument openings 10 and 11, so form the support 9 with an extension 14 at its lower edge, such extension and the arrangement of the openings providing a neat and symmetrical appearance of the three instruments when supported from the instrument board 1.

From the foregoing it will be noted that I do not discard the usual mountings of the switch and gauge, but utilize these same mountings and simply cover the same with my speedometer adapter and in consequence of such mounting there is a method involved which consists in enlarging the opening of the instrument board; dividing the usual instrument support; mounting a part of such support in each end of the board opening, and then mounting a speedometer support or plate over the support parts so that all of said instruments will have a symmetrical arrangement with the instruments in proximity to each other.

It is thought that the utility of my invention will be apparent without further description, and while in the drawing there is illustrated a preferred embodiment of my invention, it is to be understood that the structural elements are susceptible to such variations and modifications as fall within the scope of the appended claims.

What I claim is:—

1. As a means for adapting an instrument board with its instruments to receive an additional instrument to produce an instrument zone wherein the added instrument is symmetrically positioned relative to two of the previously installed instruments, wherein the pair of instruments are carried by a supporting plate overlying an opening of the board, and wherein the plate is divided into a pair of sections and separated to produce a space therebetween to receive the added instrument, an adapter plate adapted to be mounted on the board and having dimensions to permit it to overlie the separated sections, said adapter plate having apertures to expose the faces of each of the three instruments therethrough.

2. A method of mounting a speedometer on an instrument board provided with a support for a switch and gauge, which method consists in dividing the support; separating the divided support parts, and then mounting a speedometer supporting plate over the support parts to retain such support parts in engagement with said instrument board.

3. A method of mounting a speedometer on an instrument board provided with an opening over which opening a support is mounted for holding a switch and a gauge, which method consists in enlarging the opening of the instrument board; dividing the support; mounting part of the support in each end of the board opening, and then mounting a speedometer plate over the support parts so that the speedometer of the plate is between the switch and gauge.

4. A method for mounting an additional instrument on a support relative to other instruments previously mounted on the support, said method consisting in increasing the spacing of the other instruments by relative movement of the previously-mounted instruments sufficient to receive the instrument to be added, positioning the instrument to be added, and mounting an apertured instrument-supporting plate over the separated and the added instruments so that all of said instruments have a symmetrical arrangement in proximity to one another with the data of the instruments exposed through the plate apertures.

In testimony whereof I affix my signature in presence of two witnesses.

CHARLES S. TURNER.

Witnesses:
KARL H. BUTLER,
ANNA M. DORR.